(12) United States Patent
Herrmann et al.

(10) Patent No.: US 9,475,267 B2
(45) Date of Patent: Oct. 25, 2016

(54) TAPED MEDIA IMPOSITION FOR ADHESIVE IN-STORE SIGNAGE

(71) Applicant: Xerox Corporation, Norwalk, CT (US)

(72) Inventors: Douglas K Herrmann, Webster, NY (US); Hans F Case, Jordan, MN (US); Kevin St. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 40 days.

(21) Appl. No.: 14/523,963

(22) Filed: Oct. 27, 2014

(65) Prior Publication Data

US 2016/0114567 A1 Apr. 28, 2016

(51) Int. Cl.
| | |
|---|---|
| *B32B 37/00* | (2006.01) |
| *B32B 37/12* | (2006.01) |
| *B32B 37/18* | (2006.01) |
| *B32B 5/14* | (2006.01) |
| *B32B 38/00* | (2006.01) |
| *G09F 3/02* | (2006.01) |

(52) U.S. Cl.
CPC ........... *B32B 37/1292* (2013.01); *B32B 5/142* (2013.01); *B32B 37/18* (2013.01); *B32B 38/145* (2013.01); *B32B 2519/00* (2013.01); *B32B 2590/00* (2013.01); *G09F 2003/0201* (2013.01); *Y10T 156/1092* (2015.01)

(58) Field of Classification Search
CPC .......... B32B 37/0076; B32B 37/1292; B32B 38/145; G06F 2003/0201; G06F 2003/0241; B41M 5/504; Y10T 156/1089; Y10T 156/1092; Y10T 156/1097
USPC ...... 156/290, 291, 297, 299, 302; 427/208.6
See application file for complete search history.

(56) References Cited

U.S. PATENT DOCUMENTS

| | | | | |
|---|---|---|---|---|
| 5,336,541 | A * | 8/1994 | Kobayashi | G09F 3/02 283/81 |
| 5,682,696 | A * | 11/1997 | Gill | G09F 7/12 248/156 |
| 7,975,416 | B2 | 7/2011 | Engelby et al. | |
| 8,302,338 | B2 | 11/2012 | Engelby et al. | |

* cited by examiner

*Primary Examiner* — John Goff

(57) ABSTRACT

A process for creating adhesive signage for in-store shelving involves applying a PSA (pressure sensitive adhesive) tape to paper and then printing the signs on the modified substrate. The adhesive strips are 10 mils thick and the paper is 8 mils thick with the tape being positioned on a top portion only of the paper. This creates uneven stack issues in the feeder of the printer that prevents proper feeding of the sheets into the printer. These issues are eliminated by providing taped media imposition that orients the PSA to signage card color bands which are imposed in a mirror image. Mirror imaging of indicia on the card color bands evens out the sheet stack and enhances sheet feeding.

7 Claims, 3 Drawing Sheets

TAPED MEDIA IMPOSITION FOR ADHESIVE IN-STORE SIGNAGE

BACKGROUND

The present disclosure relates to creating adhesive signage sheets, and more particularly, to an improved method and article for creating adhesive signage sheets that can be uneventfully fed into a xerographic printing apparatus.

In general, marketing signs for in-store shelving can be either an adhesive type or non-adhesive type. In U.S. Pat. No. 7,975,416 B2, a non-adhesive type marketing sign is shown that includes a free portion, a base portion and a connected portion that couples the base portion to the free portion. The base portion includes an engaging piece and a support piece. The engaging piece is coupled to the support piece of a base bend line and configured to engage with a portion of a product display structure having a price holder. Another marketing sign is shown in U.S. Pat. No. 8,302,338 constructed of sheet material. The sheet material includes a free portion, a base portion and a connecting portion that couples the base portion to the free portion. The base portion includes an engaging piece and a support piece. The engaging piece is coupled to the support piece at a base bend line and configured to engage with a portion of a product display structure having a price holder. The connecting is defined between a first connecting bend line spaced apart from a second connecting bend line by a first distance. The first connecting bend line is adjacent the support piece of the base portion and the second connecting bend line is adjacent the free portion. The first distance substantially corresponds with a top edge thickness of the price holder.

The process currently used to create adhesive signage for store shelving involves applying a PSA (pressure sensitive adhesive) tape to a paper sheet or other substrate and then printing signs on the modified substrate. The tape involves an adhesive and a backer which leads to a major problem when feeding the signage into a printer due to the uneven deformation of sheet stacks as a result of the pressure sensitive adhesive tape along the top of the sheets and none along the bottom of the sheets. The media is ~8 mils thick and the adhesive tape is ~10 mils thick leading to a total thickness of roughly 18 mils on one side of the media and 8 mils on the other. One solution to this problem is to use an additional and sacrificial tape strip along the bottom of the sheets or the sheets cannot be fed. However, this creates an additional problem in that the cost of the tape used in this process is prohibitively high and the tape strips are not optimized for high speed slitting with cross process collation need for specialized in-store applications.

Therefore, there is still a need for an improved and less costly taped media that can be easily fed into a printer.

SUMMARY

A green solution in answer to this need is disclosed hereinafter that includes a unique process which creates a taped media imposition on media sheets that orients the PSA (pressure sensitive adhesive) to card color bands which are imposed in a mirror image. This removes the feeding problems, as well as, the need for a sacrificial tape strip.

BRIEF DESCRIPTION OF THE DRAWINGS

Various of the above-mentioned and further features and advantages will be apparent to those skilled in the art from the specific article or methods described in the example(s) below, and the claims. Thus, they will be better understood from this description of these specific embodiment(s), including the drawing figures (which are approximately to scale) wherein:

DETAILED DESCRIPTION OF THE PREFERRED EMBODIMENT

Figure 1:
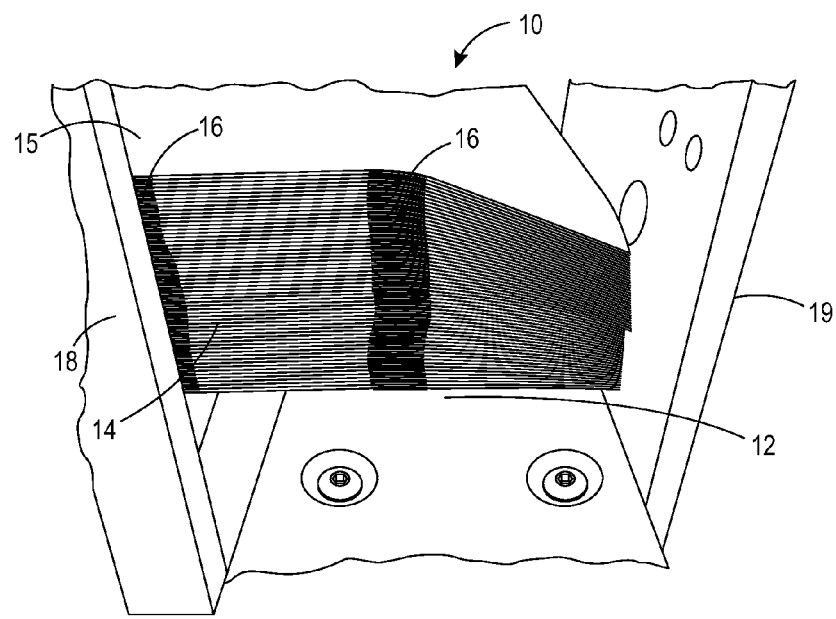
FIG. 1 is a schematic partial side view illustration of a feed tray half-full of sheets of paper with pressure sensitive tape adhered thereto.

For a general understanding of the features of the disclosure, reference is made to the drawings. In the drawings, like reference numerals have been used throughout to identify identical elements.

FIG. 1 is a schematic partial side illustration of a paper feed tray 10 of a conventional printer that supports media 15 of any kind on bottom support member 12 with the media 15 contained within side walls 18 and 19. Ordinarily, as is well known, in a conventional printer that includes tray 10, an electrostatic latent image is created on a surface of an imaging member, such as, a photoreceptor. The latent image is developed by applying thereto a supply of toner particles, such as, with a developer roll which may be of any of various designs, such as, a magnetic brush roll or donor roll, as is familiar in the art. The toner particles adhere to appropriately-charged areas of the latent image. The surface of the photoreceptor is rotated to a transfer zone created by a transfer-detack device in the printer that is usually positioned in the six o'clock position.

At the transfer zone, a print sheet is brought into contact or at least in close proximity with a surface of the photoreceptor, which at this point is carrying toner particles thereon. A corotron or other charge source causes the toner on photoreceptor to be electrically transferred to the print sheet. A print sheet is then sent to subsequent stations, as is familiar in the art, such as, a fuser and finishing devices, but in the present application is outputted onto conveyor belt.

Figure 2:
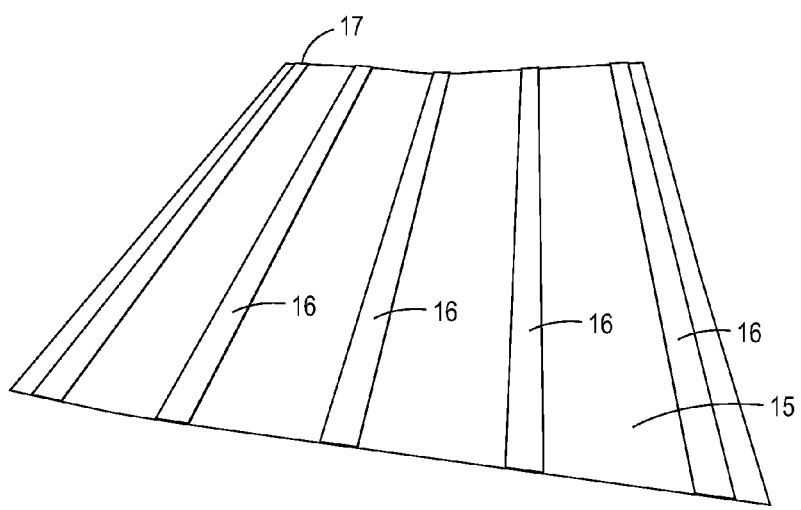
FIG. 2 is a perspective view of a prior art sheet with pressure sensitive tape adhered thereto.

Feeding of sheets 15 into the printer is where a problem occurs as shown in FIG. 1. Print stack 14 includes sheets of media 15 having pressure sensitive adhesive tape strips 16 adhered to a top portion and middle portion which creates uneven stacking issues in the feeder which causes the feeder to not feed the media into the printer properly because the bottom of the media has sagged towards wall 19 of tray 10. As shown in FIG. 2, one solution for this issue is to add an additional sacrificial pressure sensitive adhesive tape strips 17 to a bottom portion of each sheet of media 15. But, the additional sacrificial pressure sensitive adhesive tape strips 16 increase the cost of the sheets of media 15, limits the number of signage cards that can be cut from a sheet of media, creates waste, and additionally, are not optimized for high speed slitting with cross process collation needed for some customized signage card producing applications.

Figure 3:
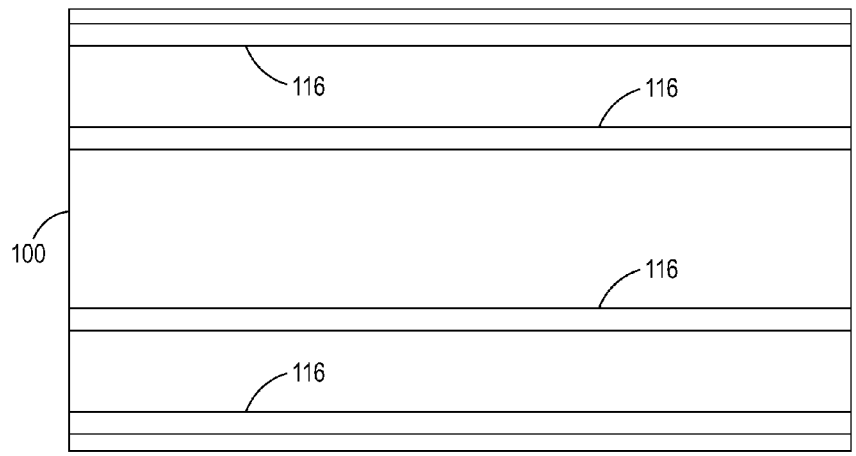
FIG. 3 is a plan view of a paper sheet with dimensioned tape imposition in accordance with the present disclosure.
Figure 4:
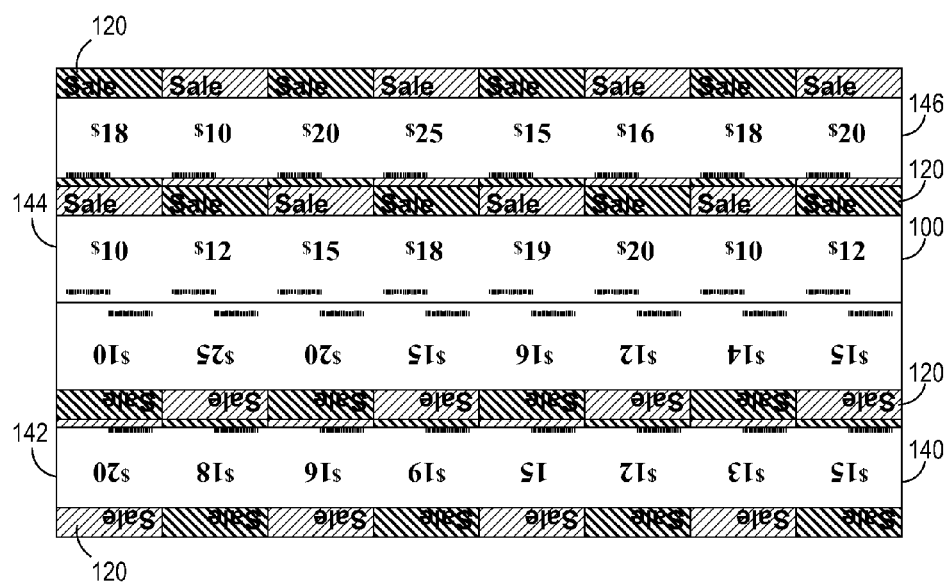
FIG. 4 is a plan view of the paper sheet of FIG. 3 including mirror image imposition.

An improved media sheet 100 is shown in FIG. 3 that has been customized for a particular signage application using dimensioned tape imposition with tape 116, and a dimensioned image imposition for use on the custom tape imposition of FIG. 3 is shown in FIG. 4. The taped media imposition of FIG. 3 orients the PSA (pressure sensitive adhesive) strips 116 to card color bands 120 of images or indicia in a mirror image with respect to a centerline of media 100. That is, with pressure sensitive strips 116 positioned in this manner, indicia in bottom two rows 140 and 142 of sheet 100 in FIG. 4 is positioned in a mirror image of the indicia on the top two rows 144 and 146 in relationship to a centerline of media sheet 100. Also, with indicia positioned on sheet 100 in this manner, the bottom of the indicia in row 142 is positioned adjacent the bottom of the indicia in row 144 without the presence of pressure sensitive adhesive tape strips 116 along the center of the sheet. This eliminates the feeding problems, as well as, the need for a sacrificial tape strip because the sheet stack of media is approximately level in height due to the imposition. The imposition also maximizes the use of each sheet of media 100 by covering the full sheet without the need for a costly and wasteful sacrificial PSA tape. The imposition of tape and cards allows for the system to compile the cards by alternating the tape strip so that the 96 card stacks can be formed with 4 alternating 24 card sub-stacks with a cross process collator.

Figure 5:
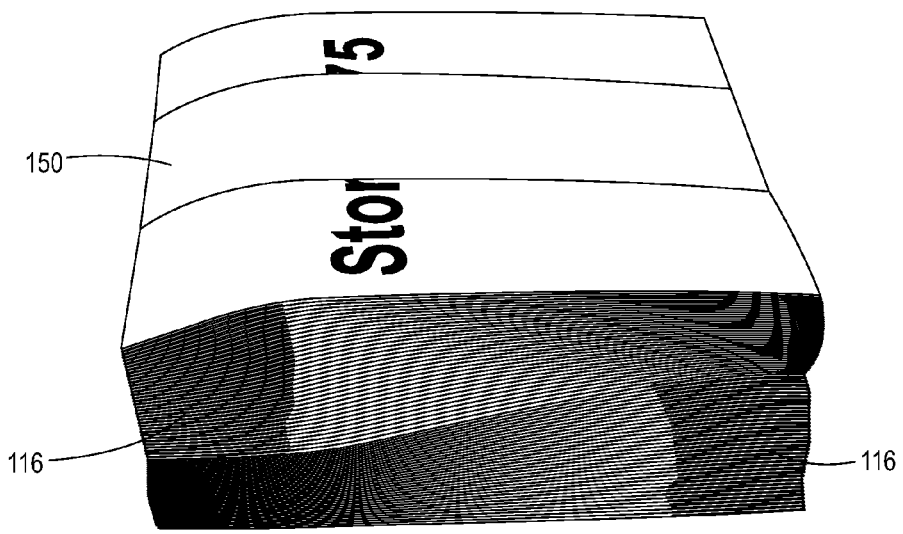
FIG. 5 is a side view of stacked adhesive signage cards made from the image imposition of FIG. 4.

In practice, to meet a demand for a high volume of signage cards per printing, media sheets are fed from a feeder into a printer and each sheet exiting the printer includes image imposition. The sheets exit the printer in a process direction into a stop and are then fed orthogonally into a conventional slitter and a cross process collation system that sweeps 4 stacks of 24 cards into a stack of 96 cards. In order to stack these cards into a stable stack of 96 cards, 48 cards are compiled with the tape in one direction and the next 48 cards are compiled rotated 180 degrees so that the stack is balanced. This can only be achieved using the mirrored imposition. In order to make stackable stacks for shipping, in FIG. 5, a banded stack 150 of 96 cards is shown rotated at the 48$^{th}$ card to thereby alternate the tape strips at the 48$^{th}$ card. Further, the imposition of tape and cards allows for the system to compile the cards by alternating the tape strips so that the 96 card stacks can be formed with 4 alternating 24 card sub-stacks with the cross process collator.

Figure 6:
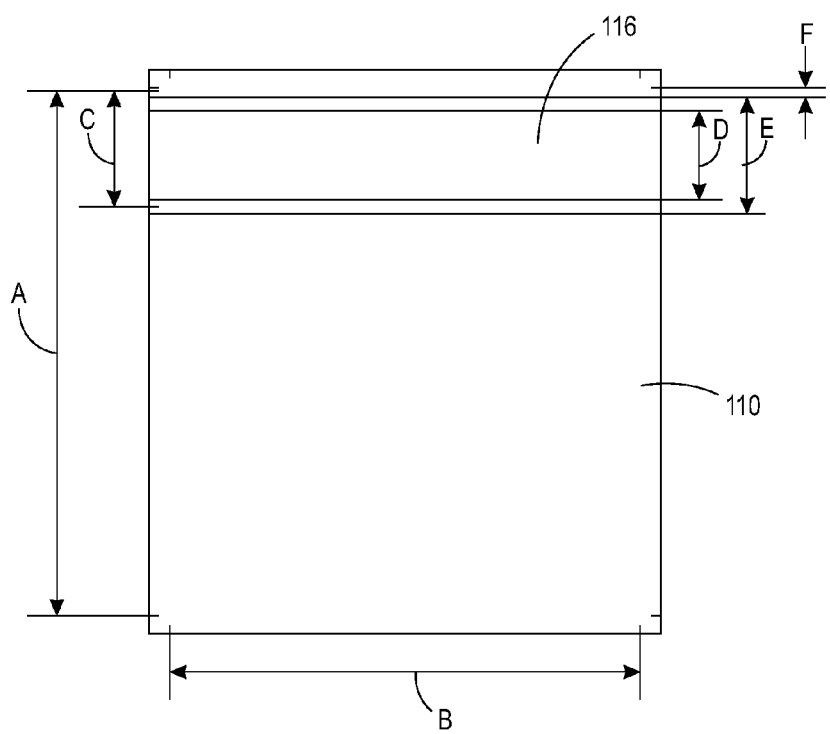
FIG. 6 is a plan view of a customized card produced in accordance with the present disclosure.

An example of a pressure sensitive adhesive taped individual 3×3 inch signage card 110 cut from sheet 100 in FIG. 4 is shown in FIG. 6 where: A is the signage sign height of 238.5 points; B is sign width of 216 points; C indicated the score location down from the trim at 50.79 points; D represents the adhesive tape 116 at 41.1 points; E is an adhesive release liner distance at 49.61 points; and F indicates adhesive release liner distance down from trim at 5.85 points. In the figure, 72 points equals 1 inch or 25.4 millimeters and 1 point equals 0.352777778 millimeters.

In recapitulation, a process has been disclosed that creates adhesive signage for in-store shelving by applying PSA (pressure sensitive adhesive) tape strips to paper and then printing the signs on the modified substrate. Heretofore, with the adhesive strips being 10 mils thick and the paper 8 mils thick and with the tape being positioned on a top portion only of the paper uneven stacking issues arose when feeding the tape from a feeder within a printer. This problem is addressed in the present disclosure by providing a taped media imposition that orients the PSA to signage card color bands which are imposed in a mirror image. Placement of PSA tape in mirror imaging of indicia on the card color bands evens out the sheet stack and thereby removes sheet feeding difficulties.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A method for creating taped media imposition for in-store signage, comprising:
    providing a substrate for receiving images thereon;
    providing pressure sensitive adhesive tape strips on a back surface of said substrate and extending a length of said substrate;
    placing a predetermined number of rows of said pressure sensitive adhesive tape strips on said substrate and positioning said predetermined number of rows of pressure sensitive adhesive tape strips such that an equal number of said predetermined number of rows of pressure sensitive adhesive tape strips are in mirror image with an equal number of other of said predetermined number of rows of said pressure sensitive adhesive tape strips;
    placing images onto a front surface of said substrate; and
    cutting said images on said substrate into individual cards and collating them into four stacks of 24 cards and subsequently into a stack of 96 cards and stabilizing said stack of 96 cards by compiling 48 of said cards with said pressure sensitive adhesive tape strips in one direction and 48 of said cards rotated 180° with said pressure sensitive adhesive tape strips in another direction.

2. The method of claim 1, including placing said pressure sensitive adhesive tape strips on said substrate with a centerline portion of said substrate being void of a pressure sensitive adhesive tape strip.

3. The method of claim 2, including placing four separate rows of pressure sensitive adhesive tape strips on said substrate.

4. The method of claim 3, including placing first and second rows of said four separate rows of pressure sensitive adhesive tape strips an equal distance apart as third and fourth rows of pressure sensitive adhesive tape strips on said substrate.

5. The method of claim 1, including creating an even stack of substrates with the placement of said predetermined number of pressure sensitive adhesive tape strips on said back side of said substrates in predetermined positions.

6. The method of claim 5, including orienting said pressure sensitive adhesive tape strips on said back surface of said substrates opposite image color bands on said front surface of said substrates.

7. The method of claim 1, including providing said pressure sensitive adhesive tape strips with a thickness of about 10 mils and said substrate with a thickness of about 8 mils.

* * * * *